(12) United States Patent
André-Jönsson et al.

(10) Patent No.: US 9,119,116 B2
(45) Date of Patent: Aug. 25, 2015

(54) METHOD AND ARRANGEMENT FOR SUPPORTING HAND OVER OF A MOBILE TERMINAL

(75) Inventors: Henrik André-Jönsson, Linköping (SE); Lena Melin, Vaxholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 646 days.

(21) Appl. No.: 13/429,010

(22) Filed: Mar. 23, 2012

(65) Prior Publication Data
US 2013/0250032 A1     Sep. 26, 2013

(51) Int. Cl.
H04W 36/00     (2009.01)

(52) U.S. Cl.
CPC ................................ *H04W 36/0022* (2013.01)

(58) Field of Classification Search
USPC .......................................... 370/331; 455/436
See application file for complete search history.

(56) References Cited

U.S. PATENT DOCUMENTS

| | | | | |
|---|---|---|---|---|
| 6,608,832 | B2* | 8/2003 | Forslow ........................ | 370/353 |
| RE43,293 | E * | 4/2012 | Wu ............................... | 370/331 |
| 8,619,675 | B2* | 12/2013 | Keller et al. .................. | 370/328 |
| 8,780,864 | B2* | 7/2014 | Rydnell et al. ................ | 370/331 |
| 2007/0100981 | A1* | 5/2007 | Adamczyk et al. ........... | 709/223 |
| 2008/0205386 | A1* | 8/2008 | Purnadi et al. ................ | 370/389 |
| 2009/0052399 | A1* | 2/2009 | Silver et al. ................... | 370/331 |
| 2010/0085962 | A1* | 4/2010 | Issaeva et al. ................ | 370/355 |
| 2010/0165948 | A1* | 7/2010 | Ore et al. ....................... | 370/331 |
| 2010/0284366 | A1* | 11/2010 | Zhu ............................... | 370/331 |
| 2010/0290433 | A1* | 11/2010 | Stojanovski et al. ......... | 370/331 |
| 2011/0064046 | A1* | 3/2011 | Zhu ............................... | 370/331 |
| 2011/0128940 | A1* | 6/2011 | Featherstone et al. ........ | 370/336 |
| 2011/0171953 | A1* | 7/2011 | Faccin et al. ................. | 455/426.1 |
| 2011/0268083 | A1* | 11/2011 | Ostrup et al. ................. | 370/331 |
| 2011/0299429 | A1* | 12/2011 | Tiwari ........................... | 370/259 |
| 2012/0014273 | A1* | 1/2012 | Notton et al. ................. | 370/252 |
| 2012/0039303 | A1* | 2/2012 | Stenfelt et al. ................ | 370/331 |
| 2013/0084860 | A1* | 4/2013 | Wong et al. ................. | 455/435.1 |
| 2013/0122912 | A1* | 5/2013 | Qu et al. ....................... | 455/439 |
| 2013/0128865 | A1* | 5/2013 | Wu et al. ....................... | 370/331 |
| 2013/0279442 | A1* | 10/2013 | Tiwari ........................... | 370/329 |
| 2013/0294407 | A1* | 11/2013 | Mutikainen et al. .......... | 370/331 |
| 2014/0146781 | A1* | 5/2014 | Chen ............................. | 370/329 |

OTHER PUBLICATIONS

3GPP, "3rd Generation Partnership Project; Technical Specification Group Radio Access Network; Evolved Universal Terrestrial Radio Access Network (E-UTRAN); S1 Application Protocol (S1AP) (Release 10)", 3GPP TS 36.413 V10.1.0, Mar. 2011, 1-256.

3GPP, "3rd Generation Partnership Project; Technical Specification Group Radio Access Network; UTRAN Iu interface Radio Access Network Application Part (RANAP) signalling (Release 10)", 3GPP TS 25.413 V10.1.0, Mar. 2011, 1-425.

3GPP, "3rd Generation Partnership Project; Technical Specification Group Services and System Aspects; Single Radio Voice Call Continuity (SRVCC); Stage 2 (Release 10)", 3GPP TS 23.216 V10.1.0, Jun. 2011, 1-43.

\* cited by examiner

*Primary Examiner* — Melvin Marcelo
*Assistant Examiner* — Peter Solinsky
(74) *Attorney, Agent, or Firm* — Murphy, Bilak & Homiller, PLLC

(57) ABSTRACT

Network nodes in a source and a target communication system, and methods therein for supporting hand over to the target communication system, of a mobile terminal supporting Packet Switched-to-Circuit Switched, PS-to-CS, hand over. The method in the source communication system comprises, when requesting resources for hand over of a mobile terminal engaged in a conversational call to a target node in the target communication system, signaling a first request for PS resources to the target communication system, indicating a bearer B, used for the conversational call, and further signaling a second request for CS resources to the target communication system, indicating the bearer B. Thereby, the target communication system is enabled to decide whether a PS-to-CS HO or a PSHO of the bearer B should be performed.

24 Claims, 9 Drawing Sheets

METHOD AND ARRANGEMENT FOR SUPPORTING HAND OVER OF A MOBILE TERMINAL

TECHNICAL FIELD

The invention relates generally to Hand Over (HO) of a mobile terminal to a target cellular communication system, and in particular to supporting the same.

BACKGROUND

Single Radio Voice Call Continuation (SRVCC) is a Packet Switched (PS) to Circuit Switched (CS) HO mechanism, which is specified by 3GPP e.g. in TS 23.216.

An SRVCC is a service that allows an ongoing Voice over Internet Protocol (VoIP) call in LTE to be transferred to the CS domain. This service makes it possible for a VoIP call over LTE to be continued even if LTE coverage is lost.

An SRVCC can be seen as a PS-to-CS handover of a VoIP call. For performing SRVCC of e.g. a voice bearer to the CS domain, the VoIP telephony session needs to be anchored in the IP Multimedia Subsystem (IMS).

An SRVCC for a UE is typically triggered by an LTE eNB serving the UE, when the signal strength, received by the UE, from the eNB and other potential target LTE nodes drops below a certain threshold, i.e. when the UE experiences unfavorable LTE signal conditions, or 'is having bad LTE coverage'.

The SRVCC mechanisms specified by 3GPP include two variants of handover from LTE to UTRAN, namely 'CS only', where only the voice bearer is handed over in a PS-to-CS HO, and other PS bearers are dropped; and 'CS and PS', where the voice bearer is handed over in a PS-to-CS HO and other PS bearers are handed over in a PSHO. The LTE eNB selects what type of SRVCC to request.

There is further a version of the SRVCC, called Single Radio Video Call Continuation (vSRVCC), which is also defined by 3GPP. As the name implies, vSRVCC relates to continuation of multimedia calls, or so-called "video calls", anchored in IMS. Such video calls may also be referred to as VoIP+video calls, IMS video calls or similar. When using the term VoIP herein, as in VoIP bearer, etc. this also embraces VoIP bearers/conversational bearers of multimedia calls.

According to the current implementation of SRVCC in 3GPP, the process is started by the eNB when the eNB requests a HO to e.g. WCDMA or GSM and indicates in the HO required message that an SRVCC is needed.

One problem with the current implementation is that in order to request an SRVCC for a UE, the eNB needs to be aware of that the UE has an ongoing VoIP session and that this VoIP session is anchored in the IMS. However, a basic design principle for Radio Access Network (RAN) nodes, such as eNB, is that these nodes should be unaware of what different kind of services that the UE is using.

Thus, the current approach has led to some very strange attempts to make it possible for the eNB to request an SRVCC for a UE. For example, it has been decided that the radio bearer that is used for a VoIP call (or video call in case of vSRVCC), i.e. the bearer that can be subject to SRVCC, is the only bearer that can be assigned the Quality Class Indicator QCI=1. No other services are allowed to use this QCI value. According to the 3GPP specifications, the operator is free to use different QCI settings for different services, but in order for SRVCC to work, QCI=1 can only be used for VoIP (including VoIP+video) over IMS services. That is, the SRVCC design is not consistent with the common design principles.

SUMMARY

It would be desirable to have more flexibility in the HO procedure. The object of the solution described herein is to provide such flexibility.

In brief, the solution described herein involves moving decisions related to HO of a conversational bearer. The decision of whether a PS-to-CS HO is relevant or not, for a bearer of a UE is moved from the RBS serving the UE to a core network node of the source system. Further, a decision of whether a PS-to-CS HO or a PSHO of the bearer is to be performed is moved from the RBS to a node in the target system.

There are several advantages associated with the solution described herein. For example, an RBS in a HO source system will not need to be aware of the capabilities of a HO target system to which a UE is to be handed over. This means e.g. reduced need for configuration of external system cells and nodes in the RBS. In LTE terminology, the decision whether to request a PS-to-CS HO, such as SRVCC, or a PSHO is moved from the eNB to the MME.

Further, the PS-to-CS procedure according to the solution described herein will not depend on the use of QCI=1 for certain E-RABs, and thus the value CQI=1 will be free to use for bearers according to e.g. operator preferences.

Less configuration of neighborhood cells in the RBS will be required, as compared to legacy solutions. In particular, the RBS does not need to keep updated about e.g. what target system (e.g., UTRAN) cells/frequencies that support PS conversational RAB and if the target system supports IMS.

Further, the HO target system will be responsible for indicating e.g. SRVCC support in a reply to the HO source system, which means that such information does not have to be manually configured in the source system. Further, the target system decides which type of HO that is to be performed of a conversational bearer, and thus there is no risk of misalignment between the source and target systems. Further, load sharing is enabled between PS and CS in the target system, based on available PS versus CS resources. It is possible to keep the legacy SRVCC procedure in parallel, thus ensuring compatibility with legacy nodes and systems.

According to a first aspect, a method in a (source system) core network node (e.g. MME) is provided in a first cellular communication system. The first communication system supports packet switching (PS), and may be of e.g. LTE or WCDMA-type. The method is for supporting HO of a UE to a target cellular communication system, where the UE supports PS-to-CS HO. The method comprises, when requesting resources for HO of a UE engaged in a conversational call: signaling a first request for PS resources and a second request for CS resources to the target communication system, where both requests relate to/indicate the same bearer, B, used for the conversational call. Thus, the target communication system is enabled to decide whether a PS-to-CS HO or a PSHO of the bearer B should be performed.

According to a second aspect, a network node is provided. The network node is operable in a cellular communication system supporting PS communication. The network node is suitable for supporting HO of a UE to a target cellular communication system, where the UE supports PS-to-CS HO. The network node comprises a functional unit configured to, when requesting resources for HO of a UE that is engaged in a conversational call to a target node in the target communication system, signal a first request for PS resources and further signal a second request for CS resources to the target communication system, where both requests relate to/indicate the same bearer, B, used for the conversational call.

According to a third aspect, a method in a target network node is provided in a target cellular communication system. The method is for supporting HO of a UE supporting PS-to-CS HO to the network node. The target communication system supports both CS and PS communication. The method comprises receiving a first and a second request for resources for HO of a bearer, B, from a source communication system. One of the first and second requests is related to CSHO and the other to PSHO. The method further comprises deciding whether to accept the request related to CSHO or the request related to PSHO, based on a criterion related to capabilities of the target network node.

According to a fourth aspect, a network node is provided for supporting HO of a UE to the network node, where the UE supports PS-to-CS HO. The network node is operable to be a target network node in a cellular communication system and supports both CS and PS communication. The network node comprises a functional unit, which is configured to receive a first and a second request for resources for HO of a bearer, B, from a source communication system. One of the first and second requests is related to CSHO and the other is related to PSHO. The network node further comprises a functional unit, which is configured to decide whether to accept the request related to CSHO or the request related to PSHO, based on a criterion related to capabilities of the network node.

According to a fifth aspect, a method is provided in an RBS in a cellular communication system supporting PS communication. The method is for supporting HO, to a target cellular communication system, of a UE supporting PS-to-CS HO. The method comprises, when receiving information from the UE indicating a need for a HO to a target node in a target cellular communication system, it is determined whether the UE supports PS-to-CS HO. If the UE is found to support PS-to-CS HO, a request is signaled, to a core network node, for HO of the UE. The request indicates that the UE supports PS-to-CS HO, but it does not indicate which type of HO that should be used, in terms of CS or PS. Thus, the decision of whether to perform a PS-to-CS HO or a PSHO is left to one or more other network nodes. The RBS does not have knowledge of the capabilities, in terms of support of VoIP and IMS, of the target node.

According to a sixth aspect, an RBS is provided. The RBS is operable in a cellular communication system supporting PS communication. The RBS is suitable for supporting HO, to a target cellular communication system, of a UE, which supports PS-to-CS HO. The RBS comprises a functional unit, which is configured to determine, when the UE indicates a need for a HO to a target node, whether the UE supports PS-to-CS HO or not. The RBS further comprises a functional unit, configured to signal, if the UE is found to support PS-to-CS HO, a request for HO of the UE. The request indicates that the UE supports PS-to-CS HO, but it does not indicate which type of HO that should be used, in terms of CS or PS.

The methods and nodes described above may be implemented in different embodiments, which will be further described and exemplified herein.

BRIEF DESCRIPTION OF THE DRAWINGS

The invention will now be described in more detail by means of exemplifying embodiments and with reference to the accompanying drawings, in which.

DETAILED DESCRIPTION

Above one problem with the current implementation of SRVCC and vSRVCC is described. Another problem with the current implementation is a complexity issue. The eNB needs to be aware of the IMS capabilities of the nodes and cells in the target communication system. If the target cell is IMS and VoIP capable, there is no reason to perform a, from a network perspective, expensive complex operation like SRVCC. In that case a normal PSHO would be all that is needed.

The use of the solution suggested herein reduces the complexity and thereby the operational cost of supporting e.g. SRVCC and/or vSRVCC in an EPC/LTE system.

This is done in two ways:
Firstly: by enabling for the eNB to treat the SRVCC operation as a normal IRATHO. There is no need to restrict the number of E-RABs using QCI=1. The MME is already service aware, and this knowledge is utilized.
Secondly: by letting the target communication system allocate resources on a "best possible" basis in the IRATHO resource preparation phase, the source system does not need to keep track of whether the target system node or cell supports VoIP or not, i.e. no configuration of that is necessary. In case the target system supports VoIP anchored in IMS, the necessary PS resources are allocated and a pure PSHO is carried out. In case the target system does not support VoIP anchored in IMS, typically, both CS and PS resources are allocated and the SRVCC operation is carried out.

The alternative HO procedure suggested herein will henceforth be referred to as the "open CS or PS request procedure".

When the MME sends a resource requirement, or request, to the target system, the requirement will be for resources for the conversational call, i.e. voice call or multimedia call. Based on the response from the target system, the MME initiates a normal PSHO or an SRVCC. The decision whether to initiate an SRVCC or not is thus moved from the eNB to the MME. The MME has knowledge of all services that a UE requests, and is thus aware of whether a UE is engaged in a conversational call or not. The MME is also informed of whether the UE supports e.g. SRVCC or not.

Figure 1:
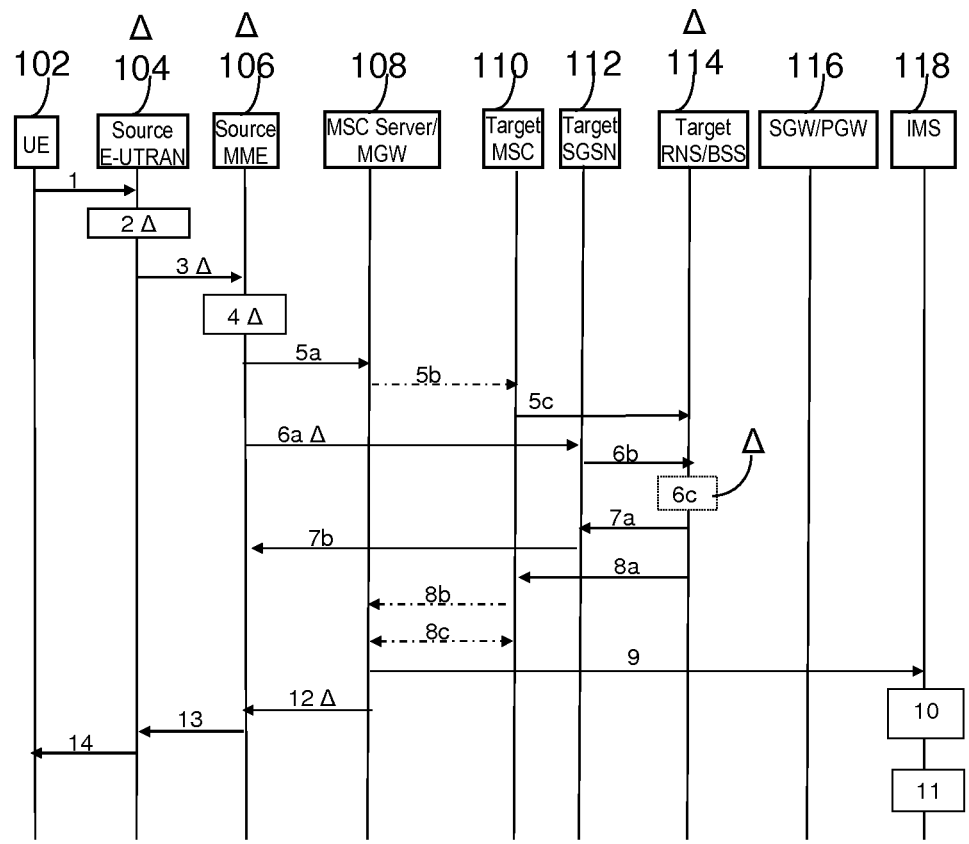
FIG. 1 shows a signaling diagram of a HO procedure, according to an exemplifying embodiment.

FIG. 1 illustrates the signaling involved in an open CS or PS request procedure. The base for FIG. 1 is picture 6.2.2.2-1 taken from the 3GPP specification of SRVCC, 23.216. The actions, messages and nodes that are modified according to the herein suggested solution have been marked with a delta, Δ. An action 6c, which is not present in the original figure, has been added, surrounded by a dotted line.

The reference numbers in FIG. 1 refer to the following actions or messages, which will also be further described below:

1: Measurement reports
2: Decision for HO (modified)
3: Handover Required (modified)
4: Bearer splitting, and UE service check (modified)
5a: PS to CS Request
5b: Prepare HO
5c: Relocation/HO Request
6a: Forward Relocation Request (modified)
6b: Relocation/HO Request
6c: Deciding Process (new)
7a: Relocation/HO Request Acknowledgement
7b: Forward Relocation Response
8a: Relocation/HO Request Acknowledgement
8b: Prepare HO response
8c: Establish circuit
9: Initiation of Session Transfer (STN-SR or E-STN-SR)
10: Session transfer and update
11: Release of IMS access
12: PS to CS Response (interpretation modified)
13: HO Command
14: HO from EUTRAN Command For simplicity, the node 104, denoted Source E-UTRAN in FIG. 1 will be referred to as "eNB", and the node 114, denoted Target RNS/BSS in FIG. 1 will be referred to as "RNC", thus using an UMTS system as an example of the target communication system.

The eNB 104 receives information 1 from a UE 102, indicating a need for a HO to another identified system, which provides better radio conditions at the location of the UE. The eNB 104 then determines 2 whether the UE 102 supports PS-to-CS HO. If the UE 104 does not support PS-to-CS HO, the "open PS or CS" solution described herein is not applicable, and a conventional PSHO may be requested (or not) (not illustrated in FIG. 1). However, if the UE supports PS-to-CS HO, the eNB sends a request 3 for HO to an MME 106. The eNB 104 does not need to know whether the UE 102 is engaged in a conversational call, or what the capabilities of the target system are, in terms of support of VoIP and IMS (which it has to know in the legacy procedure).

The MME 106 thus receives a request 3 for a HO to a target communication system of the UE 102, which supports PS-to-CS HO. If the UE 102 is engaged in a conversational call, a PS-to-CS HO may be motivated. The MME 106 determines 4 whether the UE 102 is engaged in a conversational call, based on information related to the services of the UE, which is available within the MME 106. The MME splits 4 the bearers into conversational bearer(s) and non-conversational bearers then transmits one request 5a for PS-to-CS HO of the conversational bearer(s), and one request 6a for PSHO. The difference to the legacy procedure is that the conversational bearers are included in the request 6a for PSHO, i.e. the conversational bearers are included in both requests 5a and 6a.

The requests 5a and 6a reaches, via messages 5b, 5c and 6b, the target node, RNC 114. The RNC is aware of its capacities, e.g. whether it supports CS communication, VoIP anchored in IMS, and whether it has available PS and/or CS resources. The RNC 114 decides 6c whether the HO should be accepted, and whether the conversational bearers should be handed over by PS-to-CS HO or PSHO (PS-to-PS). The decision may be made based on the capacities of the RNC 114. The RNC then indicates 7a, 8a whether the conversational bearers are accepted for PS-to-CS HO or for PSHO.

The indication reaches the MME 106 in form of messages 7b and 12 in FIG. 1. The MME 106 may then proceed with a HO procedure in accordance with the received indication. The message 12, even though indicated with a delta Δ, is not necessarily modified as such; it may still have the same standard appearance. However, the interpretation of the information of the message is modified in that the HO procedure may be deemed to be successful even when the request for CS resources (PS-to-CS HO) is rejected (e.g. a PSHO may successfully be performed instead). According to the legacy procedure, the HO procedure was only deemed to be successful if the request for CS resources was accepted.

Thus, the message S1AP HANDOVER REQUIRED, "3" in FIG. 1, which is sent to the MME 106 by the eNB 104, may result in either a PSHO of all bearers associated with the UE 102, or, a PS-to-CS HO of the conversational bearers, possibly accompanied by a PSHO of the remaining, non-conversational bearers. When the S1AP HANDOVER REQUIRED command 3 is received from the eNB 104, the MME 106 needs to determine whether any of the bearers associated with the UE (which needs to perform a HO) are used for VoIP data or multimedia call data (VoIP+video). The MME 106 would also perform applicable license checks.

When the MME receives the HANDOVER REQUIRED command 3 from the eNB, it should perform the following check:

Is the UE SRVCC capable?
Are any of the bearers involved in the HO used for a VoIP (or video call) session anchored in the IMS?

Further, in order for the solution to be compatible with legacy procedures, an Information Element (IE), or indicator, sometimes denoted 'SRVCC HO Indication', may be set by the eNB 104 in the HANDOVER REQUIRED command 3. The IE could be set to indicate 'CS only' or 'CS and PS', where 'CS only' could indicate legacy procedure, and 'CS and PS' could indicate the suggested open CS or PS procedure. It could be determined by the MME 106 whether the IE have value='CS and PS' or 'CS only', and action may be taken in accordance with the result of the determining, e.g. as exemplified in the table below:

| At MME reception of S1AP: Handover Required | if at least one conversational E-RAB and anchored in IMS | if no conversational E-RAB |
|---|---|---|
| IE 'SRVCC HO Indication' = 'CS only' | MME triggers legacy PS-to-CS (SRVCC) | MME triggers PSHO |
| IE 'SRVCC HO Indication' = 'CS and PS' | MME triggers suggested open CS or PS request procedure | MME triggers PSHO |

Note that, as specified by 3GPP, in the case legacy SRVCC 'CS only' is triggered, and the target system is GSM, eNB also indicates to MME that PS RABs shall be suspended.

MME 106 and RNC 114 need to know that the 'open CS or PS request procedure' is to be performed. However, it can be carried out by using the current standardized messages as described above and exemplified in FIG. 1.

As in the legacy implementation, the MME 106 will perform a bearer splitting, which is needed in order to separate the conversational (VoIP) component from the other PS bearers. However, in the suggested solution, the MME will also keep information needed for the parallel track of performing a pure PSHO of all E-RABs associated with the UE in question, including the VoIP bearer.

SRVCC (PS-to-CS) preparations shall be initiated quickly. But, the MME shall not do anything that cannot later be canceled depending on the response from the target RNC. The MME will thus send a resource request to the target system that does not restrict the HO, or relocation, to either of SRVCC or PSHO. Both alternatives shall still be possible. This is accomplished by sending two requests, as described above, and in more detail below:

MME sends:

1/a request to the Serving GPRS Support Node (SGSN) for all PS bearers (including the VoIP bearer) (cf. message 6a in FIG. 1), and 2/a request to anchor Mobile Switching Centre (MSC) (over Sv interface) for a PS-to-CS handover for the VoIP bearer (or VoIP+video bearer) (cf. message 5a in FIG. 1)

In the target system the RNC will receive one Radio Access Network Application Part (RANAP): Relocation request from the SGSN and one RANAP: Relocation Request from the MSC. These requests shall be coordinated according to legacy procedures specified e.g. in 3GPP TS 25.413. The difference between the suggested 'open CS or PS request procedure' and a legacy procedure for a 'CS and PS' IRATHO or SRVCC is that in the suggested 'open CS or PS request procedure', resources for the VoIP (or VoIP+video for video call) bearer are included in both messages. RNC will identify the PS RAB that is requested for the VoIP bearer by that the IE traffic class in the PS RAB parameters is set to 'conversational'.

RNC may then allocate resources on a 'best possible' basis, e.g.:

In case of support for VoIP (VoIP-only anchored in IMS and/or video call anchored in IMS): RNC allocates PS resources and rejects resource requests for CS.

In case of no support for VoIP: RNC allocates CS resources for the VoIP bearers and allocates PS bearers for other RABs.

Subsequently, based on the reply from the RNC, the MME may:

In case of support for VoIP in target system: Initiate PSHO and cancel the initiated SRVCC (PS-to-CS) operation.

In case of no support for VoIP in target system: Initiate SRVCC.

RNC also has the freedom to allocate resources in any other cell than the one suggested by eNB. If, for example, VoIP is supported in a co-located cell, resources may be allocated in this co-located cell.

Figure 2:
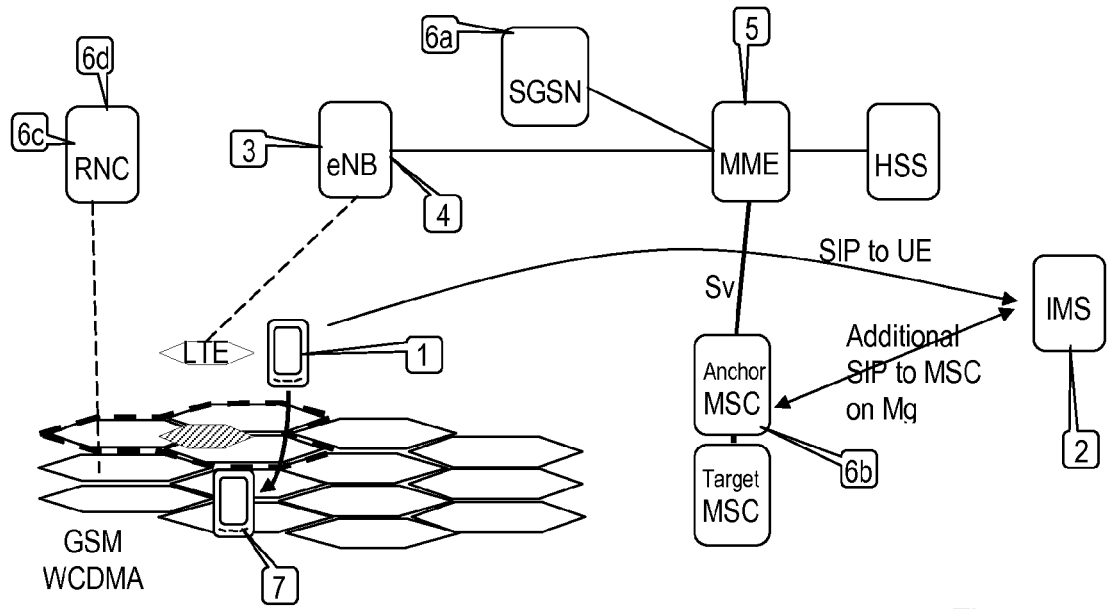
FIGS. 2 and 3 show a schematic view of the nodes and actions involved in a HO procedure according to an exemplifying embodiment.
Figure 3:
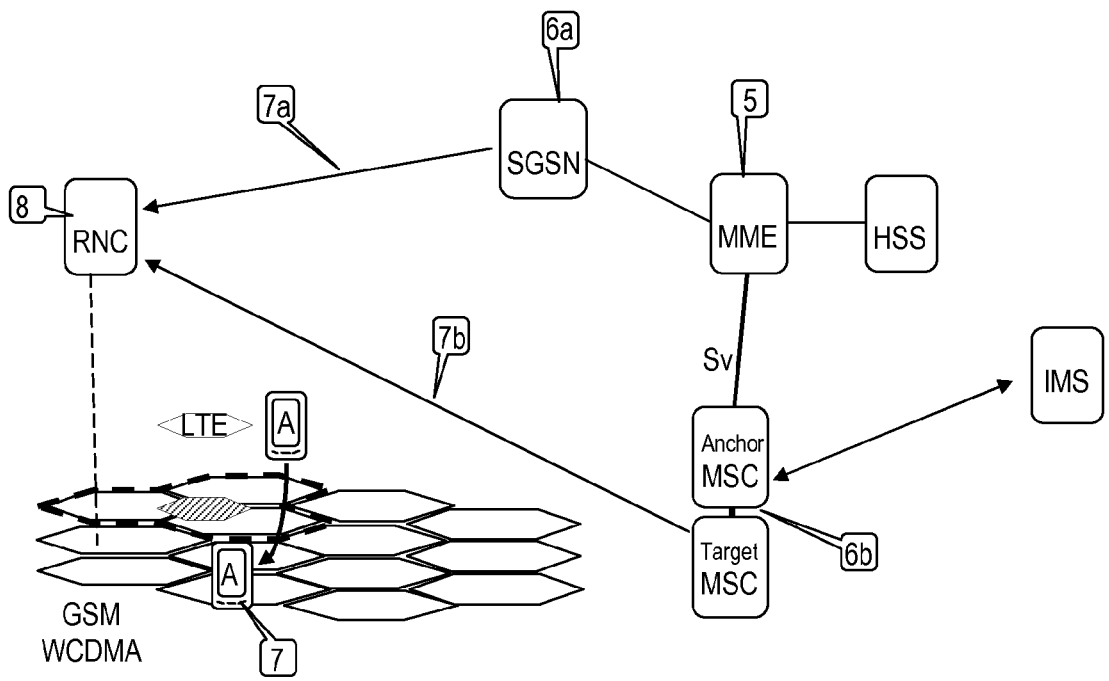

FIGS. 2 and 3 show an alternative illustration of the 'open CS or PS request procedure', partly comprising more details than FIG. 1. The reference numbers in FIGS. 2 and 3 refer to the following actions:

1: UE is EPS attached in HSS and IMS registered
2: Active IMS VoIP call
3: eNB receives measurements from UE related to 2G/3G and LTE signal
4: eNB requests SRVCC HO
5: MME splits voice and non-voice bearer and initiates HO to 2G/3G
6a: SGSN allocates PS resources for HO to 2G/3G and initiates bearer transfer from MME (parallel to CS)
6b: Anchor MSC initiates session transfer from IMS and selects target MSC. Target MSC allocates CS resources for HO to 2G/3G (parallel to PS)
6c: RNC selects which request (cf. 6a and 6b) to accept, if any.
6d: RNC responds in accordance with selection.
7: UE tunes to 2G/3G and call continues e.g. on CS; PS is continued in 3G or 2G with DTM, otherwise suspended.
7a: SGSN requests PS resources for all bearers, including VoIP bearer.
7b: Target MSC requests CS resources for voice bearer
8: RNC selects which request (cf. 7a and 7b) to accept, if any, and responds accordingly.

Alignment with Legacy Procedure

To simplify implementation of the solution suggested herein, and alignment with legacy functionality may be advantageous. For example, an MME or RNC which is upgraded to enable the open CS or PS request procedure may also be made capable of handling the legacy PS-to-CS procedure, e.g. legacy requests to and from legacy nodes which are not upgraded to the open CS or PS request procedure.

Figure 4:
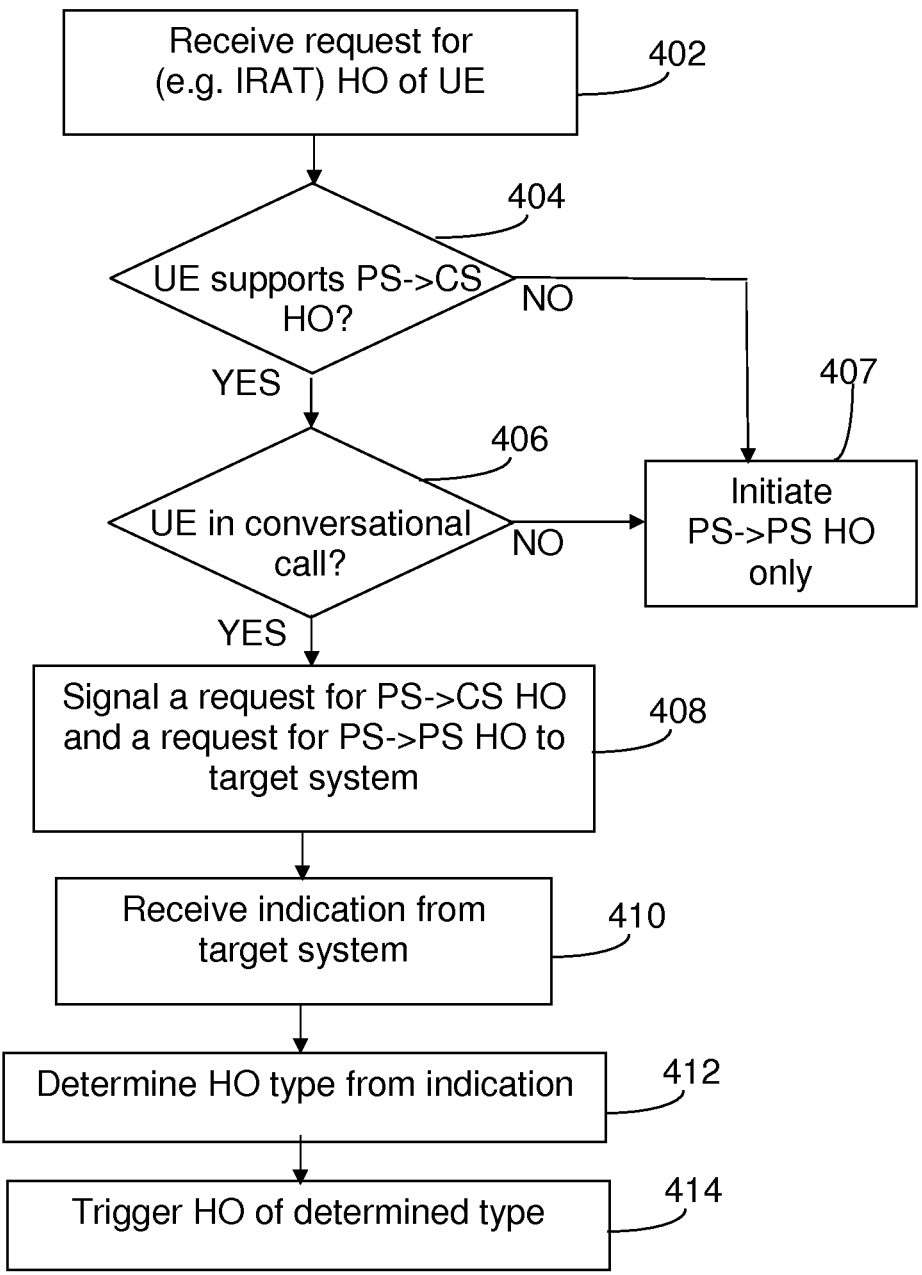
FIG. 4 is a flow chart illustrating a procedure in a source system network node according to an exemplifying embodiment.

Exemplifying Procedure, FIG. 4

An exemplifying procedure in a network node, having the role of the MME in the examples above, will be described below with reference to FIG. 4. A request for a HO of a UE to a target communication system is received in an action 402. The target communication system may be a system using another Radio Access Technology (RAT), or a system of the same type as the source system, operated by another operator. Thus, the HO could be an Inter RAT HO (IRAT), e.g. from an LTE system to a WCDMA system, or an Intra RAT HO, e.g. between two WCDMA systems operated by different operators. It is determined in an action 404, whether the UE supports PS-to-CS HO, e.g. SRVCC and/or vSRVCC, or not. Such information is included in the HO request. If the UE does not support PS-to-CS HO, a PSHO may be initiated in an action 407. If the UE supports PS-to-CS HO, it is determined whether the UE is engaged in a conversational call or not in an action 406. If the UE is not engaged in a conversational call, a PSHO may be initiated in an action 407. The actions 404 and 406 could alternatively be performed e.g. in parallel or in the reverse order.

If the UE supports PS-to-CS HO and is engaged in a conversational call, two requests are signaled to a target communication system in an action 408. The requests may be described as requests for resources for HO, or as request for HO, and are a part of a HO preparation phase. One of the requests relates to PS resources and indicates a bearer, B, used for the conversational call (and possibly other bearers as well). The other request relates to CS resources, and also indicates the bearer, B. By the above procedure, the target communication system, or target node, is enabled to decide whether a PS-to-CS or a PSHO should be performed (in legacy procedures, this is decided by the RBS in the source communication system).

Further, an indication may be received in an action 410 as a response to the first and second request. Based on the indication, the type of HO to be performed may be determined in an action 412, and said type of HO may be triggered, or initiated, in an action 414.

The conversational call is assumed to be anchored in the IMS, and to involve VoIP. The conversational call could be a regular voice call (voice only) or a multimedia call involving e.g. visual information, such as video. The type of PS-to-CS HO supported by the UE could be e.g. SRVCC and/or vSRVCC, or similar procedures being differently denoted.

Figure 5:
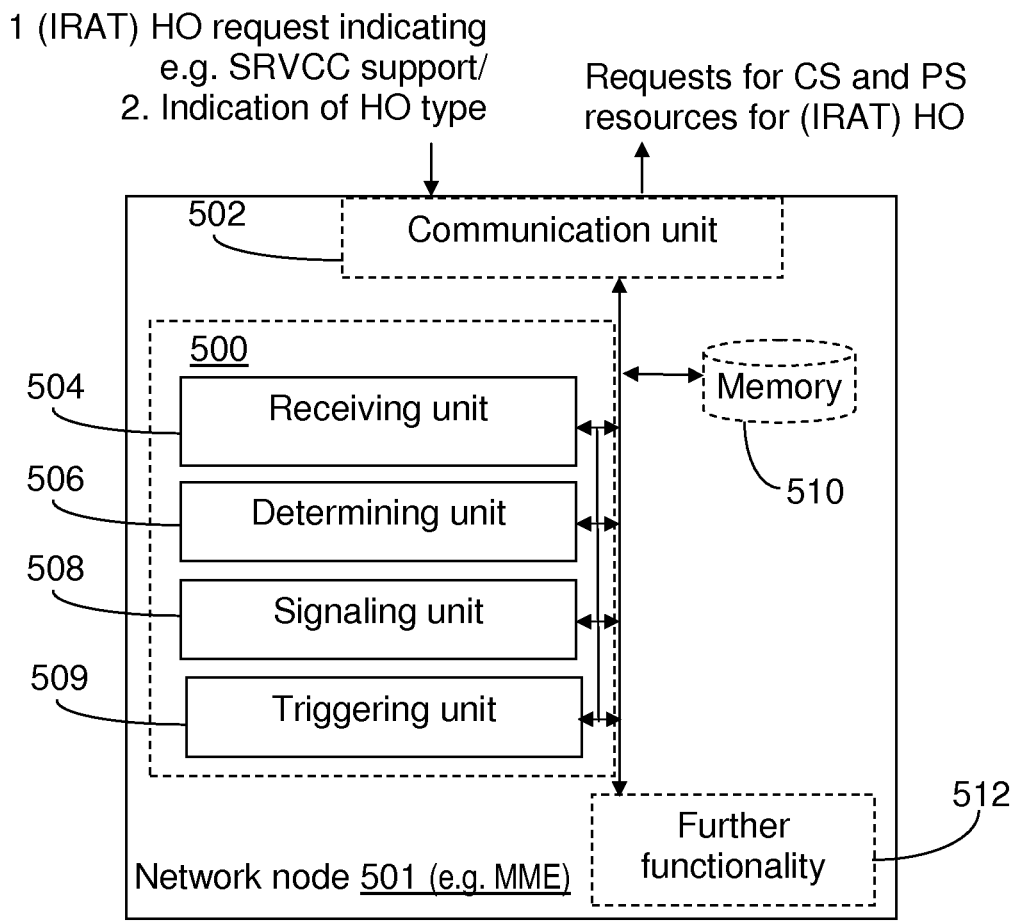
FIG. 5 is a block chart illustrating a source system network node, according to an exemplifying embodiment.

Exemplifying Network Node, FIG. 5

Below, an exemplifying network node 501, e.g. an MME in an LTE system, configured to enable the performance of the above-described procedure will be described with reference to FIG. 5. The network node 501 is operable in a PS cellular communication system. The network node 501 is suitable for supporting HO, to a target cellular communication system, of a mobile terminal, UE, supporting PS-to-CS HO.

The network node 501 is illustrated as to communicate with other entities via a communication unit 502, which may be considered to comprise means for wireless and/or wired communication. The parts of the network node 501 which are configured to enable the performance of the above-described procedure are illustrated as an arrangement 500, surrounded by a dashed line. The arrangement 500 and/or network node 501 may further comprise other functional units 512, for providing e.g. regular functions. The arrangement and/or network node may further comprise one or more storage units 510.

The arrangement 500 could be implemented by processing circuitry, e.g. by one or more of: a processor or a micro processor and adequate software (and storage therefore), a Programmable Logic Device (PLD) or other electronic component(s)/processing circuit(s) configured to perform the actions mentioned above in conjunction with FIG. 4.

The arrangement 500 may be implemented and/or described as follows: The arrangement 500 may comprise a signaling unit 508, which is configured to signal a first and a second request to a target communication system, when requesting resources for HO of a UE, engaged in a conversational call, to a target node in the target communication system. The first request relates to PS resources, and indicates a bearer, B, which is used for the conversational call. The first request for PS resources may indicate all Radio Access Bearers (RABs) associated with the UE. The second request relates to CS resources, and also indicates the bearer, B, which is used for the conversational call. The terminology "first" and "second" in relation to the requests does not necessarily indicate a corresponding chronological order of the signaling of the requests, but is only used for separating the requests. The arrangement 500 and the network node 501 comprising the arrangement are thereby configured to enable the target communication system to decide whether a PS-to-CS HO or a PSHO of the bearer B should be performed.

The arrangement 500 in the network node 501 may further comprise a receiving unit 504, configured to receive an indication from the target communication system, as a response to the first and second request. The arrangement 500 may further comprise a determining unit 506, configured to determine whether to trigger a PS-to-CS HO or a PSHO of the bearer B of the UE to the target node, based on the received indication. As described above, the HO could be an IRAT or an Intra RAT HO.

The arrangement 500 may further comprise a triggering unit 509, configured to trigger a PSHO and canceling the initiated PS-to-CS operation when a received indication indicates that the target node accepts the (first) request for PS resources; and further configured to trigger a PS-to-CS HO when a received indication indicates that the target node accepts the (second) request for CS resources. The term 'triggering' could alternatively be exchanged for 'initiating' or similar.

Figure 6:
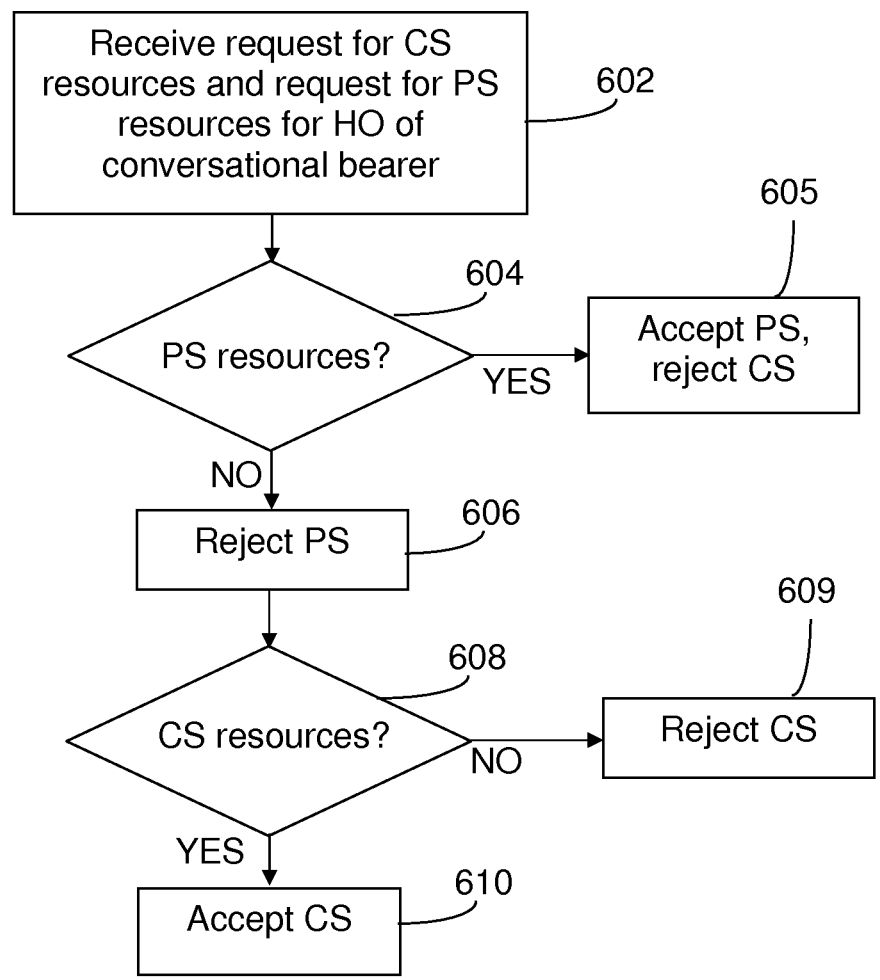
FIG. 6 is a flow chart illustrating a procedure in a target system network node, according to an exemplifying embodiment.

Exemplifying Procedure, FIG. 6

An exemplifying procedure in a network node, having the role of the target network node in the examples above, will be described below with reference to FIG. 6. The network node may be e.g. an RNC in a WCDMA-type system. The method is suitable for supporting HO of a UE, which supports PS-to-CS HO, e.g. SRVCC, and/or vSRVCC, from a source communication system to the network node. The network node 501 supports both CS and PS communication. The source communication system may e.g. be of LTE-type or of WCDMA-type.

A request for CS resources and a request for PS resources for HO are received from a source communication system in an action 602. The requests both indicate a bearer B, used for a conversational call that is to be handed over. The source communication system supports PS communication and may be a system using another RAT, or a system of the same type as the source system, operated by another operator. Thus, the HO could be an IRAT or an Intra RAT HO.

Further, it is decided in actions 604 and 608, whether to accept the request for CS resources, i.e. related to CSHO, or the request for PSHO, i.e. related to PSHO, based on a criterion related to capabilities of the network node. The capabilities may involve e.g. support of VoIP and IMS and/or current CS and/or PS capacity or load.

The decision of which request to accept, and thus of which type of HO that should be performed may then be indicated to the source communication system, e.g. in one or more of actions 605, 606, 609, 610, illustrated in FIG. 6. For example, the decision may result in that the request for PS resources is rejected, e.g. in an action 606, and the request for CS resources is accepted, e.g. in an action 610, and thus it is indicated to the source communication system that a PS- to CS HO is to be performed. Alternatively, the request for PS resources is accepted, e.g. in an action 605, and the request for CS resources is rejected, e.g. in an action 605 or 609, thus indicating to the source communication system that a PSHO is to be performed. Both requests could be rejected, e.g. if the network node does not have capacity to accept a HO. One type of request may be given priority over the other. Alternatively, some other type of indication may be used, e.g. a special message.

Figure 7:
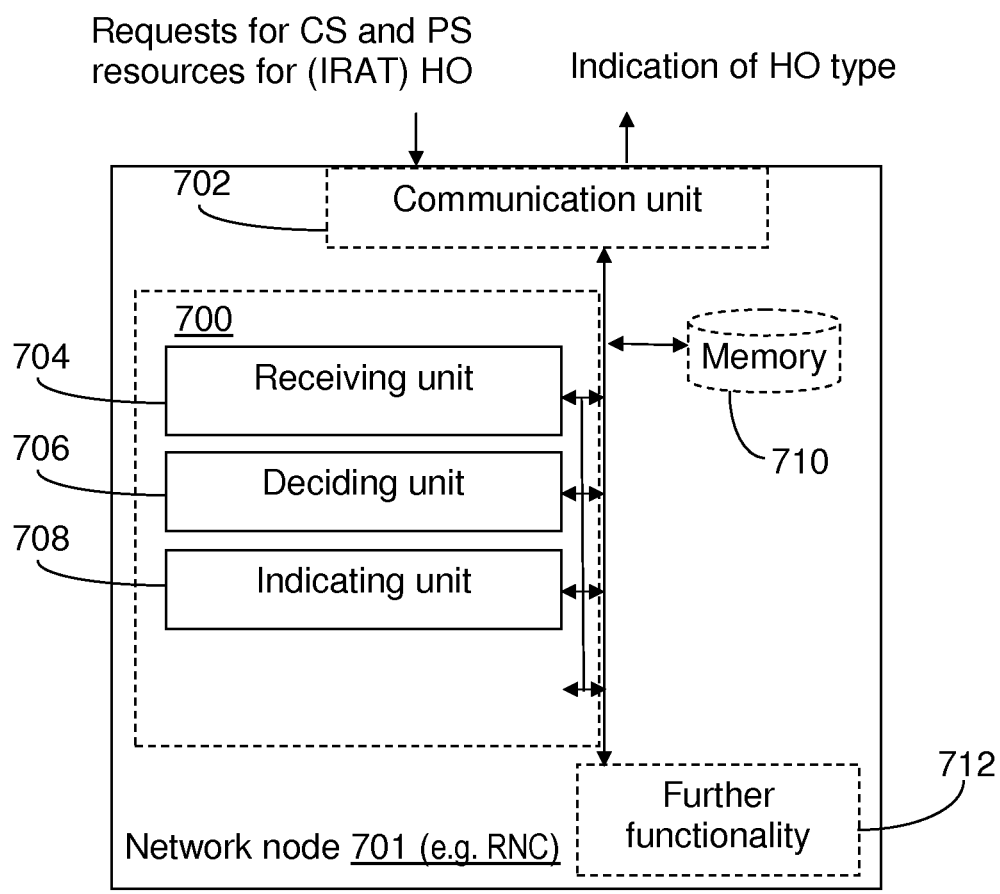
FIG. 7 is a block chart illustrating a target system network node, according to an exemplifying embodiment.

Exemplifying Network Node, FIG. 7

Below, an exemplifying network node 701 configured to enable the performance of the above described procedure related to a target network node, will be described with reference to FIG. 7. The network node may be e.g. an RNC in an UMTS-type system, such as WCDMA, The network node 701 is suitable for supporting HO of a UE, which supports PS-to-CS HO, e.g. SRVCC, and/or vSRVCC, from a source communication system to the network node 701. The network node 701 supports both CS and PS communication.

The network node 701 is illustrated as to communicate with other entities via a communication unit 702, which may be considered to comprise means for wired and/or wireless communication. The parts of the network node 701 which are configured to enable the performance of the above-described procedure are illustrated as an arrangement 700, surrounded by a dashed line. The arrangement 700 and/or network node 701 may further comprise other functional units 712, for providing e.g. regular functions. The arrangement and/or network node may further comprise one or more storage units 710.

The arrangement 700 could be implemented by processing circuitry, e.g. by one or more of: a processor or a micro processor and adequate software (and storage therefore), a Programmable Logic Device (PLD) or other electronic component(s)/processing circuit(s) configured to perform the actions mentioned above in conjunction with FIG. 6.

The arrangement 700 may be implemented and/or described as follows: The arrangement 700, and thus the network node 710 comprising the arrangement, may comprise a receiving unit 704, configured to receive a first and a second request for resources for HO of a bearer, B, from a source communication system. One of the first and second requests is related to CSHO and the other to PSHO. The arrangement 700 may further comprise a deciding unit 506, configured to decide whether to accept the request for CSHO or the request for PSHO, based on a criterion related to capabilities of the network node, as described above.

The arrangement 700 may further comprise an indicating unit 708, configured to indicate the decided type of HO to the source communication system, e.g. by accepting the request related to one type of HO and rejecting the request related to the other type of HO.

Figure 8:
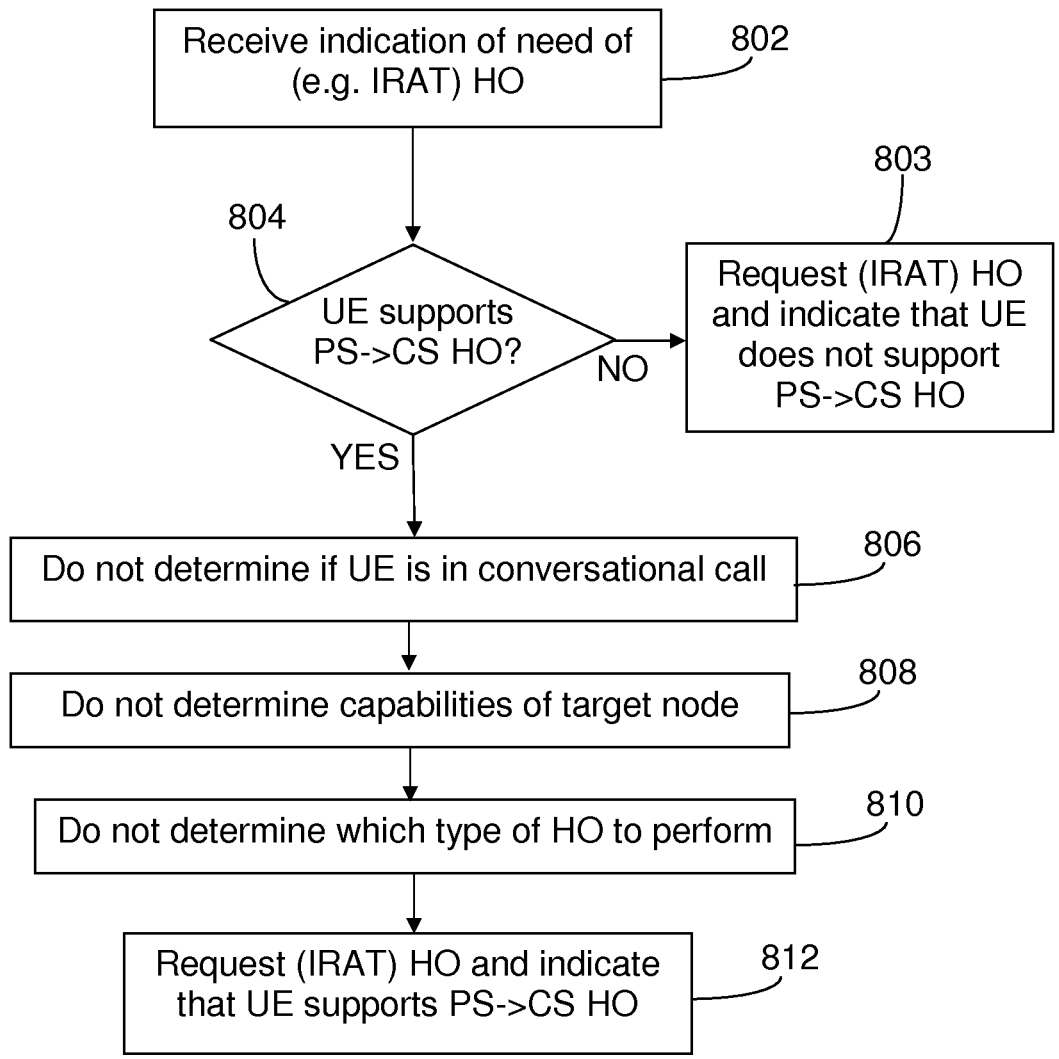
FIG. 8 is a flow chart illustrating a procedure in a source system RBS, according to an exemplifying embodiment.

Exemplifying Procedure, FIG. 8

An exemplifying procedure in an RBS 801 in a PS cellular communication system will be described below with reference to FIG. 8. The RBS may be e.g. an eNB in an LTE-type system. The method is suitable for supporting Hand Over, HO, to a target cellular communication system, of a UE, which supports PS-to-CS HO, such as SRVCC and/or vSRVCC. For specificities of the target and source system it is referred to the previously described examples related to said systems and nodes.

Information from a UE, indicating a need for a HO to a target node in a target cellular communication system may be received in an action 802. Further, it is determined, in an action 804, whether the UE supports PS-to-CS HO. If the UE does not support PS-to-CS HO, a PSHO may be requested in an action 803. If the UE supports PS-to-CS HO, an 'open PS or CS' HO may be requested in an action 812, by signaling a HO request for the UE, and indicating in the request that the UE supports PS-to-CS HO. By use of the solution provided herein, several actions that are performed in legacy procedures can be omitted, which is a great benefit. These omitted actions are illustrated as 'non-actions' 806-810 in FIG. 8. Thus, it is not determined or indicated whether the UE is engaged in a conversational call. Further, the capabilities of the target node, e.g. in terms of support of VoIP or IMS are not determined or considered. Further, it is not determined or indicated which type of HO that should be used, in terms of CS or PS. Thus, the decision of whether to perform a PS-to-CS HO or a PSHO is left to one or more other network nodes.

Figure 9:
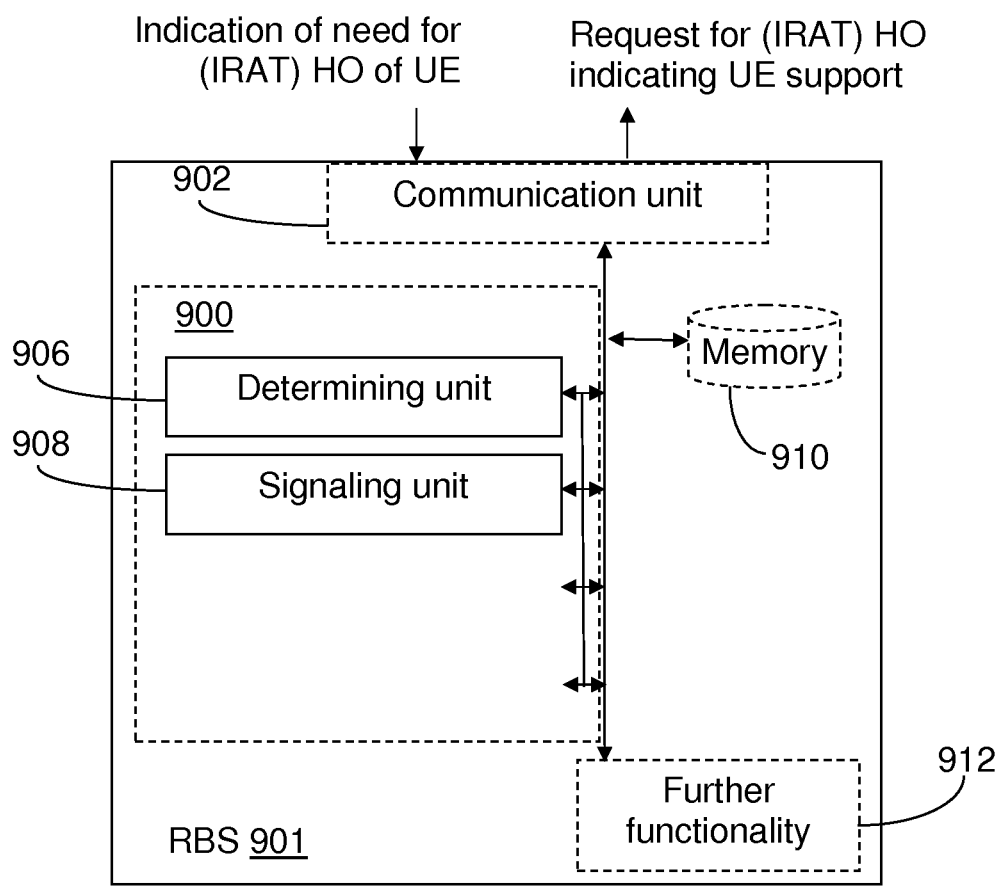
FIG. 9 is a block chart illustrating a source system RBS, according to an exemplifying embodiment.

Exemplifying Network Node, FIG. 9

Below, an exemplifying RBS 901 configured to enable the performance of the above described procedure related to an RBS, will be described with reference to FIG. 9. The RBS may be e.g. an eNB in an LTE-type system. The RBS 901 is suitable for supporting HO of a UE (served by the RBS), which supports PS-to-CS HO, to a target communication system. The RBS 901 supports PS communication.

The RBS 901 is illustrated as to communicate with other entities via a communication unit 902, which may be considered to comprise means for wireless and/or wired communication. The parts of the network node 701 which are configured to enable the performance of the above-described procedure are illustrated as an arrangement 900, surrounded by a dashed line. The arrangement 900 and/or RBS 901 may further comprise other functional units 912, for providing e.g. regular RBS functions. The arrangement and/or network node may further comprise one or more storage units 910.

The arrangement 900 could be implemented by processing circuitry, e.g. by one or more of: a processor or a micro processor and adequate software (and storage therefore), a Programmable Logic Device (PLD) or other electronic component(s)/processing circuit(s) configured to perform the actions mentioned above in conjunction with FIG. 8.

The arrangement 900 may be implemented and/or described as follows: The arrangement 900, and thus the RBS 910 comprising the arrangement, may comprise a determining unit 906, configured to determine, when a UE (served by the RBS) indicates a need for a HO to a target node in a target cellular communication system, whether the UE supports PS-to-CS HO, such as SRVSS and/or vSRVCC. The arrangement 900 may further comprise a signaling unit 908, configured to signal, if the UE supports PS-to-CS HO, a request for HO of the UE, indicating that the UE supports PS-to-CS HO. The signaling unit 908, or any other unit, is not configured to determine or indicate whether the UE is engaged in a conversational call. Further, no unit is configured to determine or consider the capabilities of the target node, e.g. in terms of support of VoIP and IMS. Further, no unit is configured to determine or indicate which type of HO that should be used, in terms of CS or PS. Thus, the decision of whether to perform a PS-to-CS HO or a PSHO is left to one or more other network nodes.

Figure 10:
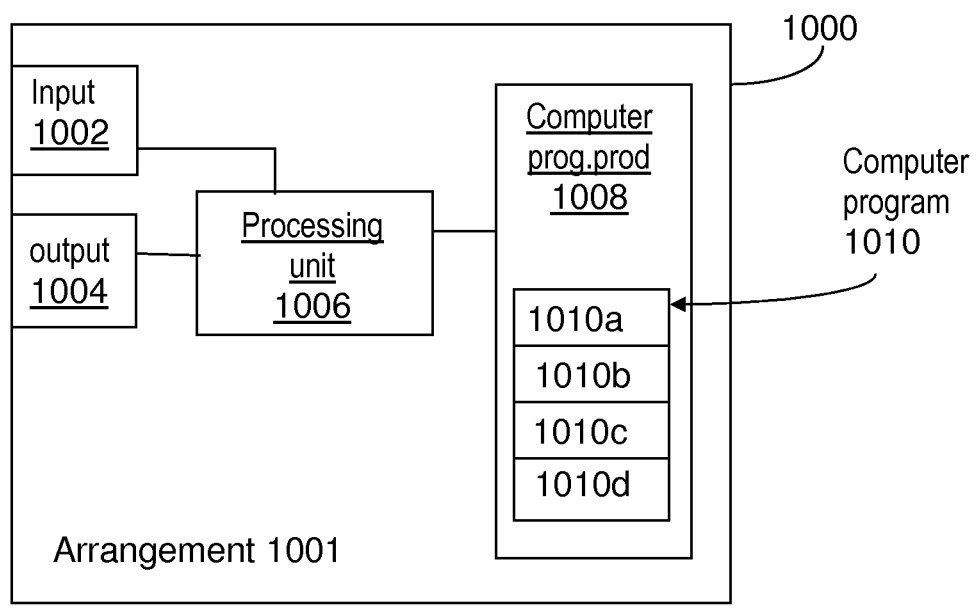
FIG. 10 is a block chart illustrating an implementation of an arrangement in a network node, according to an exemplifying embodiment.

Exemplifying Arrangement, FIG. 10

FIG. 10 schematically shows a possible embodiment of an arrangement 1000, which also can be an alternative way of disclosing an embodiment of the arrangement illustrated in any of FIG. 5, 7 or 9. Comprised in the arrangement 1000 are here a processing unit 1006, e.g. with a DSP (Digital Signal Processor). The processing unit 1006 may be a single unit or a plurality of units to perform different actions of procedures described herein. The arrangement 1000 may also comprise an input unit 1002 for receiving signals from other entities, and an output unit 1004 for providing signal(s) to other entities. The input unit 1002 and the output unit 1004 may be arranged as an integrated entity.

Furthermore, the arrangement 1000 comprises at least one computer program product 1008 in the form of a non-volatile memory, e.g. an EEPROM (Electrically Erasable Programmable Read-Only Memory), a flash memory and a hard drive. The computer program product 1008 comprises a computer program 1010, which comprises code means, which when executed in the processing unit 1006 in the arrangement 1000 causes the arrangement and/or a node in which the arrangement is comprised to perform the actions e.g. of one of the procedures described earlier in conjunction with FIGS. 4, 6 and 8.

The computer program 1010 may be configured as a computer program code structured in computer program modules. Hence, in an exemplifying embodiment, where the arrangement should be configured to perform the actions of one of the procedure described in conjunction with FIG. 4, the code means in the computer program 1010 of the arrangement 1000 may comprise a signaling module 1010a, for signaling a first and a second request to a target communication system. The arrangement 1000 may further comprise a receiving module 1010b for receiving an indication from the target communication system, as a response to the first and second request. The computer program may further comprise a determining module 1010c for determining whether to trigger a PS-to-CS HO or a PSHO to the target node. The computer program 1010 may further comprise a triggering module 1010d for triggering the appropriate type of HO.

The modules 1010a-d could essentially perform the actions of the flow illustrated in FIG. 4, to emulate the arrangement illustrated in FIG. 5. It is to be understood that corresponding arrangements for performing the actions of the procedures illustrated in FIGS. 6 and 8, may be implemented.

Although the code means in the embodiment disclosed above in conjunction with FIG. 10 are implemented as computer program modules which when executed in the processing unit causes the decoder to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general-purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

It is to be understood that the choice of interacting units or modules, as well as the naming of the units are only for exemplifying purpose, and nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities. Although the description above contains many details, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

ABBREVIATIONS

ARP Allocation/Retention Priority
EPS Evolved Packet System (EPS=LTE RAN+EPC)
E-RAB E-UTRAN Radio Access Bearer
E-UTRAN Evolved Universal Terrestrial Radio Access Network
IRATHO Inter-Radio Access Technology Handover
LTE Long Term Evolution (used synonymously with E-UTRA)
MME Mobility Management Entity
PDN Packet Data Network
PSHO Packed Switched Handover (PS-to-PS)
SRVCC Single Radio Voice Call Continuity
QCI QoS Class Identifier
vSRVCC Single Radio Video Call Continuity

The invention claimed is:

1. A method in a core network node in a packet switched (PS) first cellular communication system for supporting Hand Over (HO) to a target cellular communication system of a mobile terminal (UE) supporting PS-to-Circuit Switched (CS) HO, the method comprising:
when requesting resources for HO of a UE engaged in a conversational call to a target node in the target communication system:
signaling a first request for PS resources to the target communication system, indicating a bearer B used for the conversational call; and
signaling a second request for CS resources to the target communication system, indicating the bearer B,
thus enabling the target communication system to decide whether a PS-to-CS HO or a PSHO of the bearer B should be performed.

2. The method of claim 1, further comprising:
receiving an indication from the target communication system, as a response to the first and second request;
determining whether to trigger a PS-to-CS HO or a PSHO of the bearer B to the target node, based on the received indication.

3. The method of claim 1, wherein all Radio Access Bearers (RABs) associated with the UE are indicated in the first request for PS resources.

4. The method of claim 1, wherein the conversational call is a Voice over Internet Protocol (VoIP) call anchored in the IP Multimedia Subsystem (IMS).

5. The method of claim 4, wherein the conversational call is a multimedia call also involving visual communication.

6. The method of claim 1, wherein the UE supports at least one of a Single Radio Voice Call Continuation (SRVCC) and a Single Radio Video Call Continuation (vSRVCC) type of PS-to-CS HO.

7. The method of claim 1, wherein the HO is an Inter Radio Access Technology (IRAT) HO.

8. A network node operable in a packet switched (PS) cellular communication system, for supporting Hand Over (HO) to a target cellular communication system of a mobile terminal (UE) supporting PS-to-Circuit Switched (CS) HO, the network node comprising a processing circuit configured to:
when requesting resources for HO of a UE engaged in a conversational call to a target node in the target communication system:
signal a first request for PS resources to the target communication system, indicating a bearer B, used for the conversational call; and
further signal a second request for CS resources to the target communication system, indicating the bearer B.

9. The network node of claim 8, wherein the processing circuit is configured to:
receive an indication from the target communication system, as a response to the first and second request; and
determine whether to trigger a PS-to-CS-HO or a PSHO of the bearer B to the target node, based on the received indication.

10. The network node of claim 8, wherein the HO is an Inter Radio Access Technology (IRAT) HO.

11. The network node of claim 8, wherein all Radio Access Bearers (RABs) associated with the UE are indicated in the first request for PS resources.

12. The network node of claim 8, wherein the conversational call is a Voice over Internet Protocol (VoIP) call anchored in the IP Multimedia Subsystem (IMS).

13. The network node of claim 12, wherein the conversational call is a multimedia call also involving visual communication.

14. The network node of claim 8, wherein the UE supports at least one of a Single Radio Voice Call Continuation (SRVCC) and a Single Radio Video Call Continuation (vSRVCC) type of PS-to-CS HO.

15. A method in a target network node in a cellular communication system for supporting Hand Over (HO) of a mobile terminal (UE) that supports Packet Switched to Circuit Switched (PS-to-CS) HO, wherein the network node supports both CS and PS communication and the method comprises:
- receiving a first and a second request for resources for HO of a bearer B, from a source communication system, wherein one of the first and second request is related to CSHO and the other to PSHO; and
- deciding whether to accept the request related to CSHO or the request related to PSHO based on a criterion related to capabilities of the network node.

16. The method of claim 15, further comprising indicating the decided type of HO to the source communication system.

17. The method of claim 15, wherein the criterion is related to whether the target network node supports VoIP anchored in the IP Multimedia Subsystem, IMS, and/or related to the load on the target node.

18. The method of claim 15, wherein the UE supports at least one of a Single Radio Voice Call Continuation (SRVCC) and a Single Radio Video Call Continuation (vSRVCC) type of PS-to-CS HO.

19. A network node for supporting Hand Over (HO) of a mobile terminal (UE) to the network node, the UE supporting Packet Switched to Circuit Switched (PS-to-CS) HO, wherein the network node is operable to be a target network node in a cellular communication system and supports both CS and PS communication, and wherein the network node comprises:
- a receiving unit, configured to receive a first and a second request for resources for HO of a bearer B, from a source communication system, wherein one of the first and second request is related to CSHO and the other to PSHO; and
- a deciding unit, configured to decide whether to accept the request related to CSHO or the request related to PSHO, based on a criterion related to capabilities of the network node.

20. The network node of claim 19, further comprising an indicating unit configured to indicate the decided type of HO to the source communication system.

21. The network node of claim 19, wherein the criterion is related to at least one of: whether the network node supports VoIP anchored in the IP Multimedia Subsystem (IMS), and the load on the network node.

22. The network node of claim 19, wherein the UE supports at least one of a Single Radio Voice Call Continuation (SRVCC) and a Single Radio Video Call Continuation (vSRVCC) type of PS-to-CS HO.

23. A computer readable medium storing a computer program comprising program instructions for execution by a processor in a network node in a packet switched (PS) first cellular communication system that supports Hand Over (HO) to a target cellular communication system of a mobile terminal (UE) supporting PS-to-Circuit Switched (CS) HO, said program instructions configured to cause said network node to:
- when requesting resources for HO of a UE engaged in a conversational call to a target node in the target communication system:
  - signal a first request for PS resources to the target communication system, indicating a bearer B, used for the conversational call; and
  - signal a second request for CS resources to the target communication system, indicating the bearer B, thus enabling the target communication system to decide whether a PS-to-CS HO or a PSHO of the bearer B should be performed.

24. A computer readable medium storing a computer program comprising program instructions for execution by a processor in a target network node in a cellular communication system, to support Hand Over (HO) of a mobile terminal (UE) that supports Packet Switched to Circuit Switched (PS-to-CS) HO, said program instructions configured to cause the target network node to:
- receive a first and a second request for resources for HO of a bearer B from a source communication system, wherein one of the first and second request is related to CSHO and the other to PSHO; and
- decide whether to accept the request related to CSHO or the request related to PSHO based on a criterion related to capabilities of the network node.

* * * * *

UNITED STATES PATENT AND TRADEMARK OFFICE
CERTIFICATE OF CORRECTION

PATENT NO. : 9,119,116 B2
APPLICATION NO. : 13/429010
DATED : August 25, 2015
INVENTOR(S) : André-Jönsson et al.

It is certified that error appears in the above-identified patent and that said Letters Patent is hereby corrected as shown below:

In the Specification

In Column 5, Line 35, delete "UE 104" and insert -- UE 102 --, therefor.

In Column 10, Line 61, delete "node 710" and insert -- node 701 --, therefor.

Signed and Sealed this
Fifth Day of July, 2016

Michelle K. Lee
*Director of the United States Patent and Trademark Office*